United States Patent Office.

THOMAS V. ALLIS, OF BRIDGEPORT, CONNECTICUT, ASSIGNOR, BY MESNE ASSIGNMENTS, TO THE INTERNATIONAL TIN PLATE CORPORATION, A CORPORATION OF NEW JERSEY.

COMPOUND FOR USE IN REDUCING METAL SHEETS IN PACKS.

SPECIFICATION forming part of Letters Patent No. 704,285, dated July 8, 1902.

Application filed February 8, 1901. Serial No. 46,493. (No specimens.)

*To all whom it may concern:*

Be it known that I, THOMAS V. ALLIS, a citizen of the United States, and a resident of Bridgeport, in the county of Fairfield and State of Connecticut, have invented a certain new and useful Compound for Use in Reducing Metal Sheets in Packs, of which the following is a specification.

This invention consists in a compound or composition made of water and a refractory material and an adhesive substance for coating the contact-surfaces of metal plates to prevent the adhesion or cohesion of the same in the operation of reducing the same in packs to sheets.

The composition is composed, specifically, of the following ingredients in substantially the following proportions: water, four pounds; asbestos, (powdered,) three pounds; glue, (liquid,) four ounces. These ingredients are thoroughly mixed in any suitable manner to the consistency of thin paint.

When iron or steel is brought to a certain heat, the cinder therein appears upon the surfaces, and if two pieces are in contact and subjected to pressure the tendency of the pieces will be to stick or weld together. Therefore when several plates are placed one upon another and heated and reduced at too high a temperature they cannot readily be separated. With the present invention this difficulty is obviated.

The compound may be applied to the surfaces of the metal with a brush or in any other suitable manner that will form a thin film thereon, care being taken that the coating is rendered clear of lumps and evenly spread. The glutinous or sticky substance possesses the necessary adhesive qualities, so that when the water has evaporated there will remain a thin hard film or coating over the surfaces of the metal, which can be handled without disturbing the coating. By the use of the above compound there is no tendency of the metal plates or sheets to stick or weld together when subjected to the necessary heat and reducing devices.

In the use of pulverized asbestos in this compound I have found it to embody characteristics and properties that render it particularly desirable for the purpose set forth, and that glue diluted with water and mixed with asbestos in about the proportions stated forms a substance that is readily applied to the metal surfaces, and when the water has evaporated the asbestos adheres thereto in the form of a thin film or skin, and which can be subsequently removed by the ordinary processes of cleaning. These characteristics of a glutinous or sticky substance are not found in oleaginous or resinous matter heretofore applied to this purpose, which when decomposed by the heat form a skin not readily nor thoroughly removed by ordinary processes of cleaning. I also observe in this use of pulverized asbestos that its particles flatten and spread under pressure, and the piled sheets which form the pack move more easily upon each other in their unequal elongation in passing between the reducing-rolls, and that within any practical range of degree of heat the characteristics above enumerated are not affected.

In the manufacture of tin-plate it is absolutely essential that the surface of the metal be freed of any foreign substance prior to tinning, and in the use of my invention this result can be easily effected.

The term "refractory material" as used in claim 1 is intended to cover any material which will resist the temperature to which the packs must be heated before rolling.

What I claim as new, and desire to secure by Letters Patent, is—

1. A compound for coating the contact-surfaces of metal plates in packs to prevent adhesion or cohesion of the plates in the operation of heating and reducing the same to sheets, consisting of a refractory material combined with water and an adhesive substance.

2. The within-described compound for coating the contact-surfaces of metal plates in packs to prevent adhesion or cohesion of the plates in the operation of heating and reducing the same to sheets, consisting of powdered asbestos combined with water, and an adhesive material.

Signed at Bridgeport, in the county of Fairfield and State of Connecticut, this 7th day of February, A. D. 1901.

THOMAS V. ALLIS.

Witnesses:
JOHN B. CLAPP,
JOHN H. WARD.